Nov. 20, 1928.  1,692,348

F. A. PULLEN

STRIP MAP HOLDER

Filed Oct. 18, 1927    2 Sheets-Sheet 1

Inventor
F. A. Pullen

By Clarence A. O'Brien
Attorney

Nov. 20, 1928.

F. A. PULLEN

STRIP MAP HOLDER

Filed Oct. 18, 1927

Inventor

F. A. Pullen

By Clarence A. O'Brien
Attorney

Patented Nov. 20, 1928.

1,692,348

UNITED STATES PATENT OFFICE.

FRED A. PULLEN, OF LA FONTAINE, INDIANA.

STRIP-MAP HOLDER.

Application filed October 18, 1927. Serial No. 226,943.

This invention relates to strip map holders adapted for use in conjunction with moving vehicles whereby to act as a guide for the operator of the vehicle and has for its principal object to provide an article of this character adapted to be operatively connected with the speedometer drive shaft of the vehicle so as to cause the movement of the map carrying spool at the same relative speed as that of the vehicle.

Another object is to provide means enabling the frame upon which the map carrying spools are mounted to be removed from the holder whereby to permit the changing of the map according to the particular location over which the vehicle is traveling.

A further object is to provide means for moving the drive means for the spool into or out of operative position with respect to the speedometer shaft and including a construction whereby the spools may be rotated in a forward or reverse direction.

A still further object is to provide a device of this character of simple and practical construction, neat and attractive in appearance, efficient and reliable in performance, relatively inexpensive to manufacture and install and otherwise well adapted for the purpose for which the same is intended.

Other objects and advantages reside in the special construction and combination of the various elements comprising the invention, reference being had to the accompanying drawings, wherein:—

Figure 1:
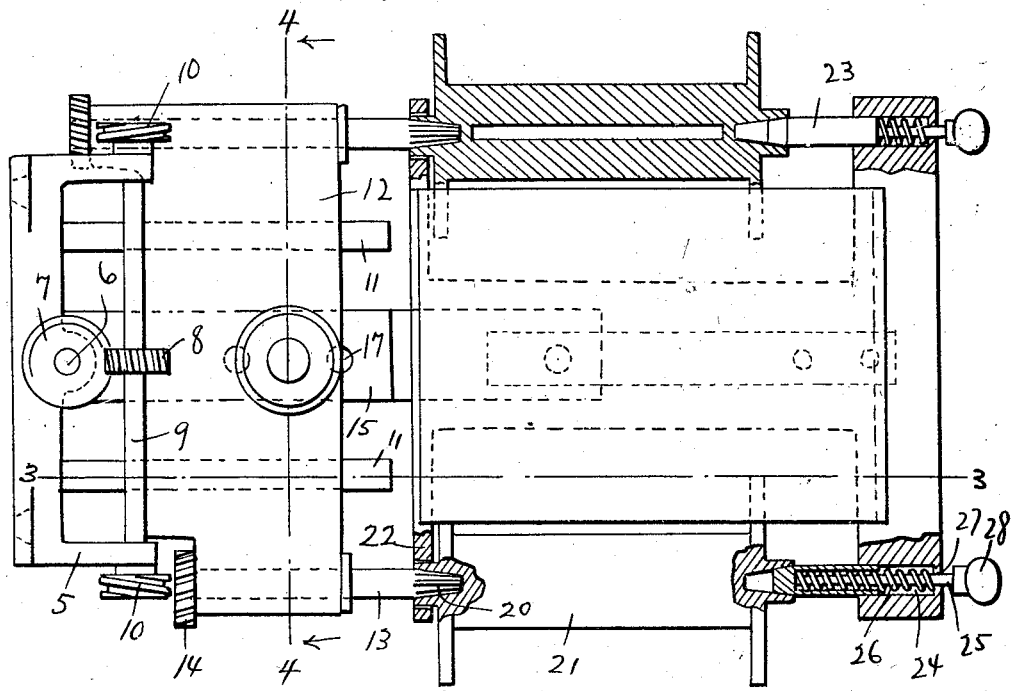
Figure 1 is a top plan view.
Figure 2:
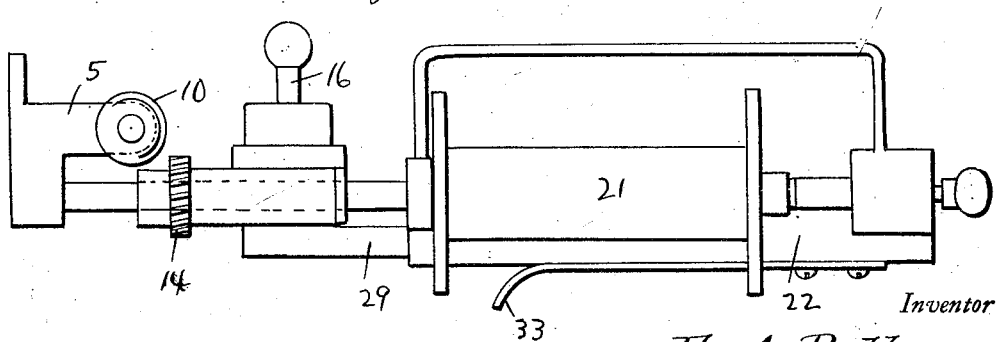
Figure 2 is a side elevational view.
Figure 3:
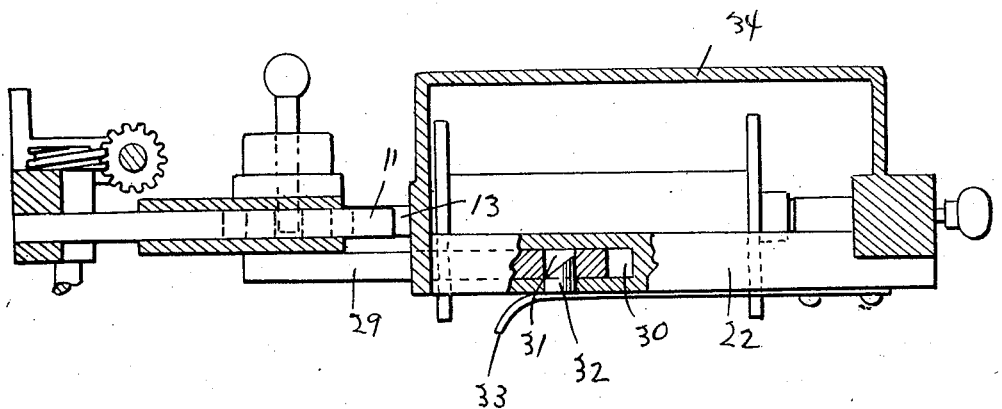
Figure 3 is a longitudinal sectional view taken along a line 3—3 of Figure 1, and, Figure 4 is a transverse sectional view taken along a line 4—4 of Figure 1.
Figure 4:
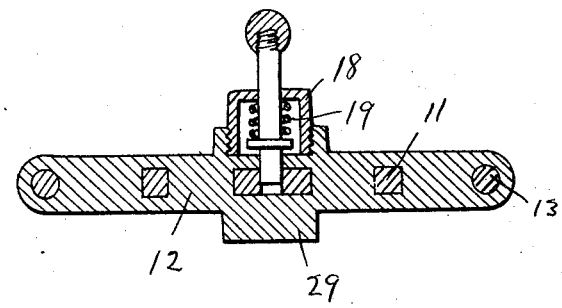

Referring to the drawings in detail, the invention comprises a stationary frame indicated generally at 5, which may be secured to any suitable part of the vehicle, as for instance upon the instrument board of an automobile or the control board of an aeroplane and carries a shaft 6 arranged in constant operative connection with the drive shaft of the speedometer of the vehicle, said shaft having a worm gear 7 mounted thereon engaged with a worm wheel 8 mounted intermediate the ends of a countershaft 9 extending transversely of the frame and journaled therein with a pair of worm gears 10 mounted on the opposite ends thereof.

A pair of guide arms 11 extend from the frame 5 in spaced parallel relation and are slidably carried in openings formed in a movable carriage 12 having a pair of shafts 13 rotatably journaled in the opposite ends thereof and arranged for movement with the carriage, one end of each of said shafts having a worm gear 14 mounted thereon, the respective worm gears being adapted for engagement with the worm gears 10 carried at the opposite ends of the shaft 9. As will be noted from an inspection of Figure 1 of the drawing, the movement of the carriage in one direction toward the gears 10 will operate to engage one of the worm wheels 14 with its associated gear, while the opposite worm wheel and gear are disposed in inoperative position, and the movement of the carriage in an opposite direction will operate to reverse the engagement of the respective gears.

Intermediate the guides 11 and extending parallel therewith is an arm 15, secured at one end to the frame 5 and slidably carried within an opening formed in the carriage. Upon the upper face of the carriage is arranged an upwardly extending pin 16 having its lower end inserted through an opening formed in the carriage and arranged to be inserted in any one of a set of openings 17 formed in the arm 15 upon the movement of the carriage in a proper position to aline the respective openings. A housing 18 is arranged on the upper side of the carriage through which the pin extends and within which is disposed a coil spring 19 normally forcing the pin in engaged position with respect to said opening. The openings 17 comprise three in number, the movement of the carriage enabling the pin to register with either of said end openings operating to bring one set of the gears 10 and 14 into operative engagement, the movement of the carriage for registering the pin in the opposite end opening resulting in the engagement of the gears at the opposite side of the carriage and the insertion of the pin in the central opening operating to maintain the carriage in a position with the gears in inoperative position.

The ends of the shafts 13 opposite from the gears 14 are formed into tapered ends 20 having longitudinally extending serrations formed thereon and adapted to be inserted in recesses formed in one end of map carrying spools 21, the ends of said spools engaged by the shaft 13 being journaled for rotation at opposite sides of a frame 22, the opposite ends of the spools being rotatably supported on pins 23 slidably mounted in openings 24 formed in the opposite end of the frame. The ends of the pins 23 are normally forced into supporting position with respect to the spools by means of plungers 25 carrying coil springs 26 having one end secured to the pin with the opposite ends of said spring abutting shoulders 27 formed in the opening 24. The ends of the plungers remote from the pins 23 are provided with operating knobs 28. The knobs may be utilized manually to rotate the respective spools when desired, whenever the gears 14 of the carriage shaft are disengaged from the gears 10.

The underside of the carriage 12 is provided with a tenon 29 arranged intermediate the sides thereof with its outer end fitted into a recess 30 formed in the frame 22. The tenon and underside of the frame 22 are provided with alined openings 31 adapted to receive a pin 32 formed on a spring latch 33, the pin being adapted to normally maintain the tenon in inserted position within the recess 30 whereby to secure the carriage 12 and frame 22 in fixed position with respect to each other. It is apparent however, that upon the removal of the pin that the frame 22 may be detached from the carriage 12 for the purpose of changing the map when desired.

A cover 34 may be mounted above the map extended between the spools 21, the opposite ends of the cover being secured to the frame 22. The cover 34 may be formed of glass or other transparent material thereby enabling the inspection of the map, which as indicated, is adapted to travel about the spools beneath the same.

Either of the spools 21 may be removed from the frame 22 by releasing the pin 23 from the end thereof, which thereby enables the spool to be moved longitudinally and detached from the end 20 of the shaft 13.

It is also apparent that either of the shafts 13 for rotating the respective spools may be selectively moved into or out of operative position with respect to the worm gear 10 for reversing the direction of travel of the map, one of the shafts being idle while the opposite shaft is arranged in operative position.

It is obvious that the invention is susceptible of various changes and modifications without departing from the spirit or scope of the appended claim or sacrificing any of its advantages, and I accordingly claim all such forms of the device to which I am entitled.

I claim:—

In a strip map holder, a stationary frame, a gear mounted thereon adapted for operative connection with a speedometer drive shaft, a counter-shaft journaled on said frame, means operatively connecting the same with said gear, gears mounted on each end of said counter-shaft, a carriage slidably arranged on said frame, a pair of shafts journaled for rotation in said carriage, means operatively connecting said shafts for opposite rotation with said counter-shaft gears, manually operated means for selectively moving said carriage shafts into and out of operative position, a map spool frame, means detachably connecting said frame with said carriage, a pair of spools mounted in said map frame and arranged for rotation by said carriage shafts and means for manually operating said spools when the carriage shafts are disconnected from said speedometer drive shaft.

In testimony whereof I affix my signature.

FRED A. PULLEN.